Oct. 15, 1968 M. FRIEDMAN 3,405,620
CAMERA APPARATUS
Filed April 27, 1966 5 Sheets-Sheet 1

INVENTOR
*Melvin Friedman*
BY
*Brown and Mikulka*
ATTORNEYS

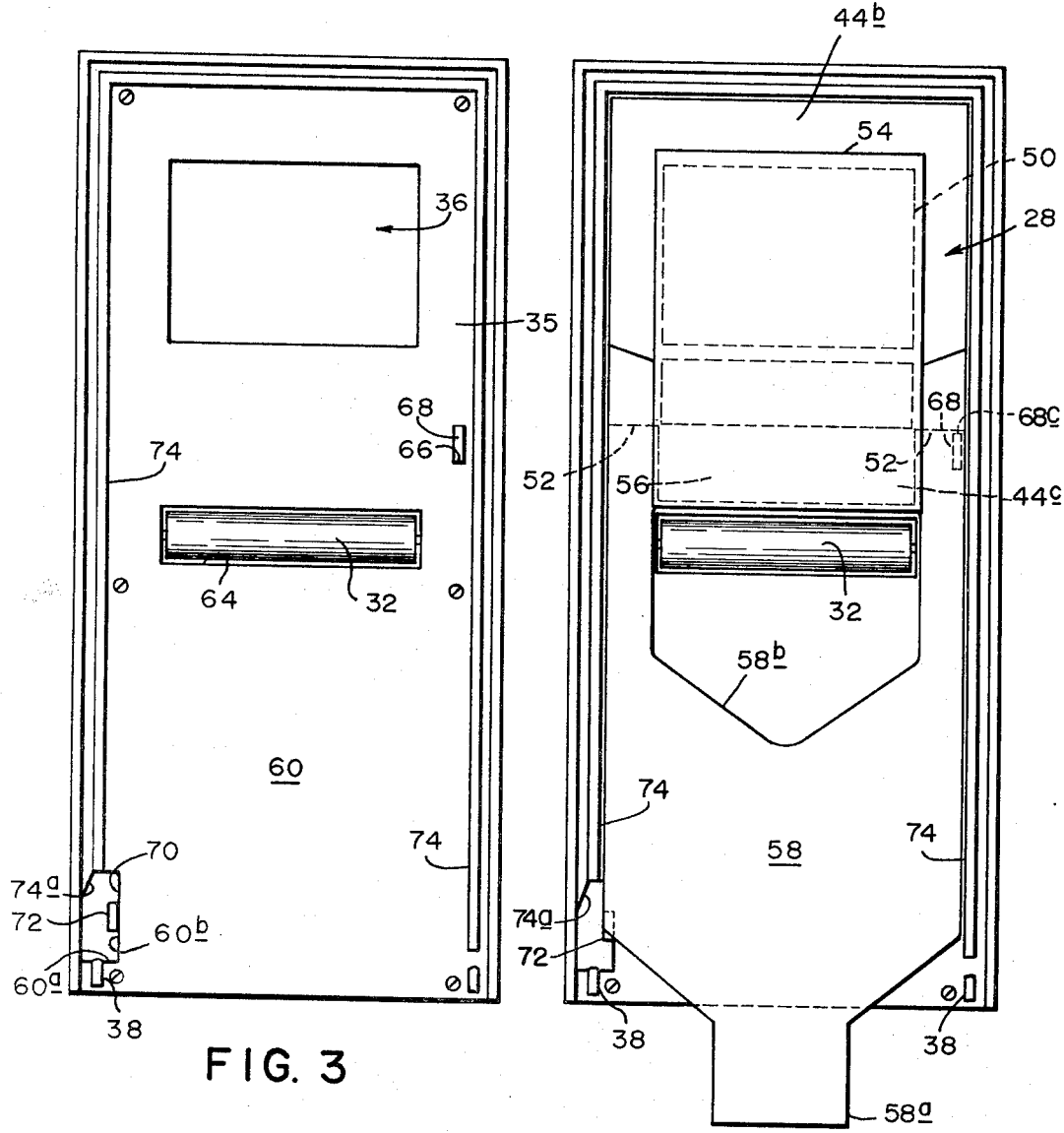

Oct. 15, 1968  M. FRIEDMAN  3,405,620
CAMERA APPARATUS
Filed April 27, 1966  5 Sheets-Sheet 3

INVENTOR
Melvin Friedman
BY
Brown and Mikulka
ATTORNEYS

Oct. 15, 1968 M. FRIEDMAN 3,405,620
CAMERA APPARATUS
Filed April 27, 1966 5 Sheets-Sheet 4

INVENTOR
Melvin Friedman
BY
Brown and Mikulka
ATTORNEYS

Oct. 15, 1968

M. FRIEDMAN 3,405,620

CAMERA APPARATUS

Filed April 27, 1966

INVENTOR
Melvin Friedman

BY Brown and Mikulka

ATTORNEYS

United States Patent Office 3,405,620
Patented Oct. 15, 1968

---

3,405,620
CAMERA APPARATUS
Melvin Friedman, Arlington, Mass., assignor to Polaroid Corporation, Cambridge, Mass., a corporation of Delaware
Filed Apr. 27, 1966, Ser. No. 545,738
10 Claims. (Cl. 95—13)

This invention relates to apparatus for incorporation with a camera for so controlling operations of photographic exposure and processing of a film unit therewithin as to insure a correct relation and performance of these operations.

Apparatus of the present invention is adapted to embodiment in a camera of the general well-known type sold by the Polaroid Corporation of Cambridge, Mass., U.S.A., in which a film assembly incorporating a releasably-contained processing liquid is photographically exposed and, thereafter, subjected to compressive means for releasing and spreading the liquid throughout a photosensitive emulsion component. After an imbibition period of a few seconds a finished print is provided on an image-receiving surface component of the film assembly by a diffusion transfer process.

More particularly, the camera and film assembly with which the subject apparatus is adapted to be employed are of so-called miniature or 35 mm. categories. A related camera is described in U.S. Patent No. 3,225,670. Similar film assemblies in the form of a film pack with a carrying magazine therefor are shown in U.S. Patent No. 3,225,671. Each film assembly includes a substantially rigid frame or mount which enables the finished print to be viewed with utmost convenience, either directly or as a projected image, immediately upon its removal from the camera.

Objects of the present invention are to provide apparatus for embodiment in a camera cooperating with exposure and processing means thereof and with a film assembly of the character described for insuring that a correct performance and sequence of exposure and processing of the film assembly occur; to provide a miniature camera incorporating apparatus of the type stated which is operative to prevent a double exposure of the film assembly; to provide apparatus for controlling the exposure and processing of premounted film assemblies which include a releasably-confined processing liquid; to provide apparatus as characterized which is especially adapted to incorporation with a miniature camera using a miniature premounted self-processing type of film assembly; to provide apparatus, as detailed, which precludes a premature processing treatment of the film assembly, that is, any chance of its being subjected to compression before it has been exposed; to provide apparatus of the stated category which practically assures retention of the film assembly within a protective environment until its processing has been completed; to provide apparatus, as stated, which serves to indicate at all times the exposure and processing status of each film assembly; to provide apparatus of the character described which includes means interlocking with shutter-release mechanism of the camera and cooperating with structure of the film assembly to control correct photographic exposure and processing thereof; and to provide apparatus of the nature characterized which is of relatively uncomplicated structure and positive in action.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a diagrammatic plan view of an interior film-supporting portion of the camera, taken along the line 3—3 of FIG. 1;

FIG. 4 is a diagrammatic plan view similar to that of FIG. 3 but showing a film assembly positioned therewithin;

As previously intimated, a film assembly of a type suitable for use with the apparatus of the present invention includes a releasably-carried processing liquid. It is of a multilayer structure such that after exposure, release of the liquid by the application of a compressive force to a liquid-containing component thereof and imbibition of the liquid into predetermined layers, including an exposed silver halide emulsion layer, provide an image. The image is formed by the transfer of image-forming substances to a designated image-receiving surface. Processing is initiated by moving the film assembly between compressive means, as by drawing manually upon a leader of the film assembly in the present instance. A processing liquid suitable for use in forming the image may comprise an aqueous solution of a silver halide developer such as hydroquinone, a silver halide solvent of the type of sodium thiosulfate, and an alkaline substance such as sodium hydroxide. It may also preferably include a thickening or film-forming agent such as a synthetic polymer of the type of sodium carboxymethyl cellulose and, possibly, a high-molecular-weight polymeric mordant to facilitate the transfer process. In producing a black-and-white image, a latent image is developed; the exposed silver halide is reduced to silver, and the unreduced silver forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Or, a black-and-white image in conjunction with a color screen may be employed to provide an image visible in a gamut of colors. Methods and film materials for producing black-and-white or multicolored images, of categories broadly related to those contemplated herein, are described in U.S. Patents Nos. 2,543,181, 2,614,926, 2,707,150, 2,726,154, 2,944,894, 2,968,544, 2,983,606 and 3,087,815.

Figure 1:
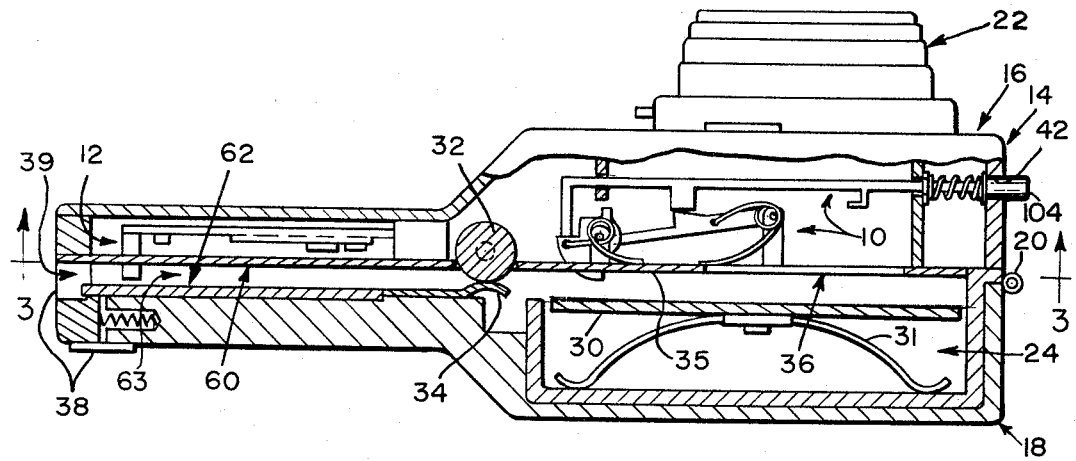
FIGURE 1 is a diagrammatic side view, partly in section, of a camera showing the subject apparatus incorporated therewith.
Figure 2:
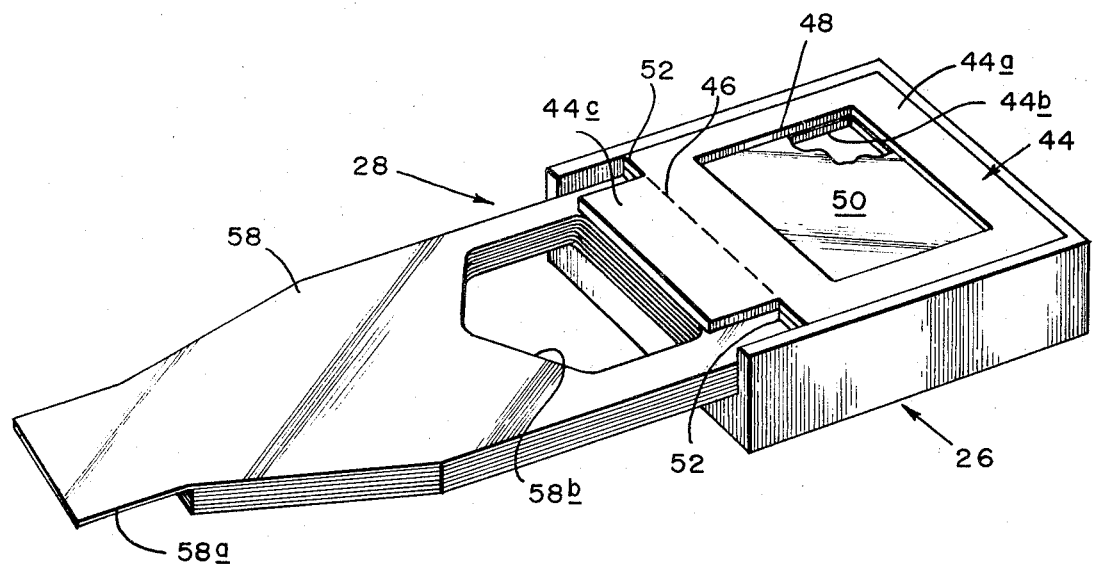
FIG. 2 is a diagrammatic perspective view of a magazine and film assemblies adapted to use with the camera of FIG. 1.
Figure 5:
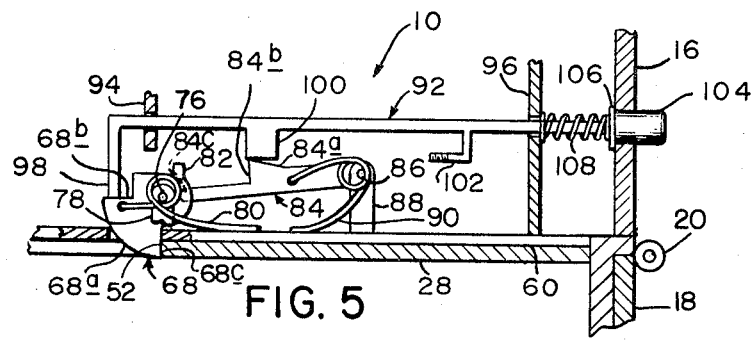
FIGS. 5 through 8 are diagrammatic side views illustrating a sequence of operations of an element of the apparatus for controlling the photographic exposure and initial movement of each film assembly from the focal plane toward processing means of the camera.
Figure 6:
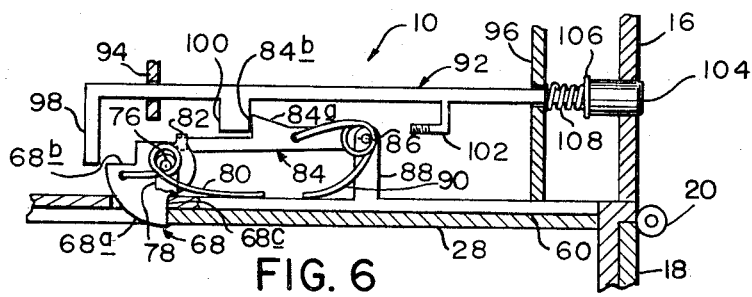

Referring now to FIG. 1, components or subassemblies 10 and 12 of the exposure and processing control apparatus of the invention are shown incorporated with a miniature camera 14. The camera includes a front housing section 16, a rear housing section 18, pivotal means connecting the housing sections at 20, a lens, diaphragm and shutter assembly 22, a chamber 24 for accommodating a magazine 26 (FIG. 2) which, in turn, holds a film pack comprising a plurality of film assemblies 28 of a type above described, a pressure plate 30, biased by a spring element 31 for urging the film assemblies forwardly within the magazine; a pair of compressive means, including the pressure roll 32 and the pressure plate 34 between which the film assembly is adapted to be drawn following its exposure at the focal plane 35 by light entering the camera exposure aperture 36; latching means 38 for releasably holding the front and rear housing sections 16 and 18 in closed relation; and a slot-like, shielded exit aperture at 39, through which processed film assemblies are withdrawn.

The butttton 104, extending for to-and-fro movement through an aperture 42 formed in a wall of the front housing section 16, serves both to actuate the shutter for performing a photographic exposure, and to operate the control means 10 of the present invention. The shutter may be of a self-cocking type or separate means may be provided for tensioning it, as by rotating one of the rings of the assembly 22. It is to be understood that automatic or manual means, not specified in detail but of a generally conventional nature, are also included for obtaining correct distance, diaphragm and shutter speed settings and that provision for flash photography is, of course, contemplated. The terms "front" and "rear," or their equivalents, as employed herein with respect to the position or movement of elements or of film-assembly components, relate to their comparative nearness or remoteness with respect to the front or lens of the camera.

An understanding of operation of the exposure and processing control apparatus 10 and 12 of the invention requires a brief description of the physical structure of the film unit or assembly 28 which, as supplied, is of a partially- or semi-mounted type. It is shown from the front in FIG. 2 and from the rear in FIGS. 4 and 11–13. The film assembly comprises a flat, substantially rigid frame, like mount 44 composed, for example, of a cardboard or a suitable plastic. It includes a front section 44a of four sides and a rear section 44b of three sides, the latter being superimposed with and bonded to the front section exclusive of that side of the latter from which extends the flap or leaf 44c. At a final stage, when the film assembly has been removed from the camera, the flap 44c is adapted to be pivoted rearwardly 180° along the semi-perforations 46 so that it lies against, and is bonded to, that side of the front section from which it originally extended as a coplanar appendage. Together, cut-out areas of the frame-like front and rear sections 44a and 44b form an exposure aperture 48, within which are mounted those portions 50 of the film assembly which are employed in formation of an image. These portions 50 of the film assembly are attached to the mount between its front and rear sections and include at least a supported photosensitive emulsion and an image-receiving sheet or layer.

Continuing the description of the film assembly 28, it will be noted that the flap 44c is of a lesser width than that of the mount itself. This provides the shoulders 52 at each side of the flap which serve an important function in conjunction with the processing control means of the invention, as will be described in detail below. Attached to the rear surface of the flap 44c, adjacent to its leading edge, is an opaque cover sheet 54 which prevents any possibility of a damaging passage of light from one film assembly of the film pack to another during each photographic exposure and which also serves as a control wall or barrier during spreading of the processing liquid over the photosensitive emulsion. A rupturable container releasably holding the processing liquid and attached to the cover sheet 54 is indicated at 56. Compression of the container and release of the liquid is effected during passage of the film assembly between the compressive means 32 and 34, the latter preferably comprising a biasing surface having a radius of curvature similar to that of the pressure roll 32. An opaque protective sheet, not shown, is provided preliminarily across the front face of the magazine 26 to protect photosensitive elements from ambient light during loading of the film pack. This protective sheet is withdrawn as an initial step after the magazine and film pack have been loaded in the camera.

Completing the description of the film assembly, an elongated leader 58 is releasably attached to its rear surface. The leader includes a draw tab 58a at its extremity which is adapted to extend through the exit aperture 39 and to be grasped for performing manual advancement of the film assembly. The leader includes a central cut-out area or opening 58b. This open area insures exclusion of stacked leader portions from the bite of the compressive elements 32 and 34 thus preventing any undue forcing apart of these elements.

The apparatus subassemblies 10 and 12 of the invention for controlling photographic exposure and processing will now be described in detail. A supporting plate element 60, constituting a frontal guide-and-bearing surface for each film assembly during its exposure and processing, extends substantially throughout the length of the camera. It includes the portion at 35 adjacent to the camera exposure aperture which establishes the focal plane. A relatively short supporting plate element 62 provides a rear guide-and-bearing surface complementing that of plate 60 and forms therewith a processing chamber 63.

The plate element 60 includes the exposure aperture 36; an aperture 64, through which the pressure roll 32 protrudes rearwardly slightly; an aperture 66 adapted to permit rotational movement of the detent element 68, and an aperture 70 which enables translational movement of the detent element 72. Detent elements 68 and 72 are those portions or components of the exposure and processing apparatus which, with the pressure plate 30, the bearing surfaces 60 and 62 and the longitudinal guide flanges 74 at either side of surface 60 are in contact with and directly affect movement of the film assembly.

The apparatus subassembly 10, which may be termed a first control means, comprises a plurality of interacting or cooperating elements principally located forwardly of the plate 60, as follows. The detent element 68 is mounted for rotation at pivot 76 extending between the arms of a yoke 78, the latter projecting forwardly from the plate 60. Detent element 68 is biased in a counterclockwise direction, as illustrated in FIGS. 5–8, by the torsion spring 80. It includes a cam surface 68a, a functional bearing surface 68b, a functional bearing surface 68c, and an overturned lug or catch 82. A lever 84 is pivotally mounted at 86 on a stud 88, the latter also extending forwardly from the plate 60. An intermediate portion of lever 84 is so angularly shaped as to provide a forwardly-extending first bearing surface or projection at 84a, and a transverse locking surface at 84b. A second bearing surface 84c is provided adjacent to its extremity. The lever 84 is biased in a clockwise direction, as illustrated in FIGS. 5–8 by the torsion spring 90. A shaft 92 is slidably mounted in camera support portions 94 and 96 and camera housing or casing section 16 for horizontal movement, as illustrated. The shaft 92 includes a first locking end-component 98 extending or depending rearwardly at 90°, a central bearing and latching component 100 also extending or depending rearwardly at 90°, a shutter-interlocking or connecting means 102, and the actuating button 104 having an integral retaining collar 106. A compression spring 108, encircling the shaft 92, is positioned between the support 96 and the collar 16, thereby tending to bias the shaft to the right, as shown in the illustrations of FIGS. 5–8, and to propel the actuating button 104 to its maximum outward position, the collar 106 serving as a limit stop against further movement in this direction. Operation of the subassembly 10 is interrelated to that of the subassembly 12 and, therefore, will be treated in conjunction with operation of the latter.

Figure 9:
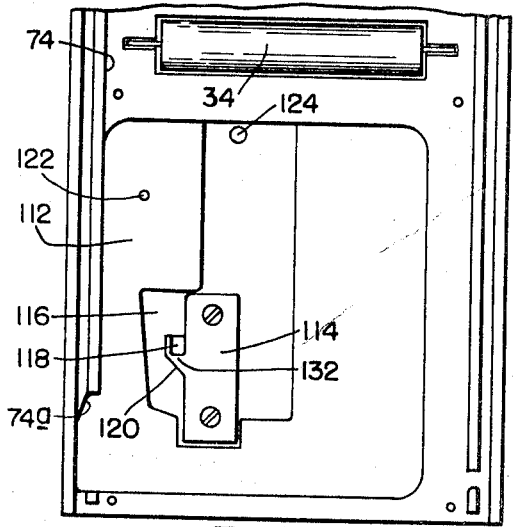
FIGS. 9 and 10 are fragmentary diagrammatic plan views, taken in a direction similar to that of FIG. 3, illustrating mechanism of the invention for determining the environment within which the diffusion transfer process occurs by controlling withdrawal of each film assembly from the camera.

The subassembly 12, which may be termed the second control means of the apparatus, comprises a plurality of elements also located forwardly of the plate 60, as follows. The detent element 72 is an integral appendage of a supporting plate-like element 110, the latter being mounted for both pivotal and translational movement within frontal camera section 16 so as to be capable of movement in a plurality of directions. Mounting means (FIG. 9) for the plate-like element 110 and its associated components comprise the substantially coplanar bearing surfaces 112 and 114, the forwardly-recessed well 116, the rearwardly-inclined ramp 118, the rearwardly-raised bead or guide 120, the threaded bore 122 and the rearwardly-projecting post 124. The plate-like element 110 may be considered as a modified bell-crank, one arm terminating in the detent 72 and a second arm constituting the angularly-extending portion 110a.

Figure 10:
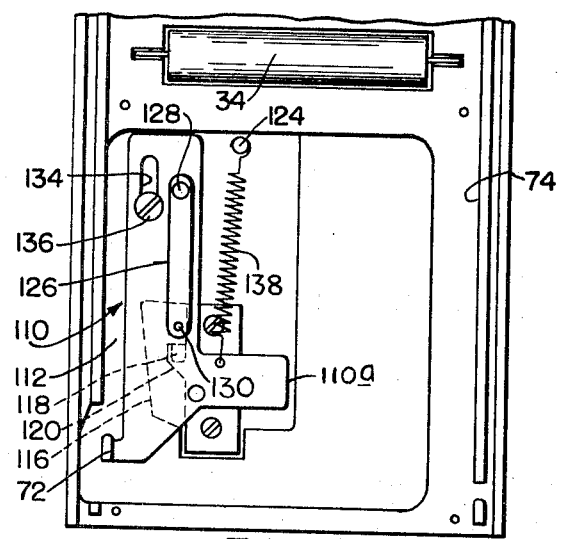

Continuing the description of the subassembly 12, an arm 126 in the form of a flat spring is fastened, e.g., riveted, to the element 110 at 128. A forwardly-projecting pin 130, at the opposite end of the arm 126, extends through an underlying aperture formed in element 110. It thus extends into the well 116, at the position of components shown in FIG. 10, and, during translational movement of the element 110, is adapted to ride up the ramp 118 generally rearwardly to a summit or "plateau" area 132; pass across the latter, and again drop into the well 116 at a new location. The new foregoing movements of the pin 130 are permitted by the resilience of the arm 126. The plate-like element 110 is mounted for slidable movement by means of an elongated slot 134, formed therein, and by the retaining stud or cap-screw 136 which is threadedly fastened in the bore 122, the edges of the slot 134 being in slidable contact with the cap-screw. The element 110 normally assumes the position shown in FIG. 10, under bias applied to the extension spring 138 which is connected, respectively, to the laterally-extending arm 110a of the plate-like element and to the post 124. Maximum travel of the element 110 in a generally longitudinal direction toward pressure roll 34 is determined by a limit stop formed by the extremity of the slot 134 which, in the illustration of FIG. 10, is shown in contact with the cap-screw 136. Maximum travel of element 110 in an opposite direction is controlled by contact of the detent element 72 with the laterally-extending edge portion 60a (FIGS. 3, 11, 12, 13) of plate 60. An adjacent recessed edge portion 60b of supporting plate 60 serves as a guide for detent element 72 during an initial stage of its bodily travel. It will be noted that the guide 74 has been cut away at 74a to allow detent element 72 to undergo a certain amount of lateral movement.

Operation of the subject apparatus will now be given in detail. Assuming the magazine 26 and contained film pack to have been loaded in the camera 14 and the protective preliminary covering, previously mentioned, to have been removed, a foremost film assembly will be positioned at the focal plane 35 as urged by the pressure plate 30. Accordingly, the film-assembly leaders 58 are adapted to extend forwardly in superimposed relation within the chamber formed by the space existing between the plate elements 60 and 62. The tab 58a of the foremost leader will protrude slightly through the aperture at 39. A film assembly, thus positioned, would appear, in plan, as illustrated in FIG. 4. It will be noted that the leader overlies the detent element 72 so that it can be advanced freely without interference by the detent. As shown, the image-forming areas 50 will be understood as being aligned with the camera exposure aperture 36. A given one of the shoulders 52, namely, the right-hand one in FIG. 4, is contacted by the detent surface 68c, the latter being biased thereagainst by torsion spring 80 and locked against movement by locking component 98. The film assembly is thus ready for photographic exposure and cannot be advanced until it is exposed.

The photographic exposure is performed by pressing the button 104 which actuates a shutter release mechanism, not shown, joined to the connecting means 102. Simultaneously, elements of the control subassembly 10 assume the positions shown in FIG. 6. The latching component 100 has moved to the left and lever 84 has moved in a clockwise direction under bias applied by torsion spring 90 so that latching component 100 contacts the locking surface 84b and the tip of lever 84 is in contact with the lug 82. Accordingly the button is locked at an "in" position, with spring 108 compressed, this position of the button indicating to the operator that the film assembly has been exposed but has not yet been processed.

To process the film assembly 28, it is advanced from the photographic exposure position of FIG. 4 by manually drawing upon the tab 58a, it being understood, of course, that the film assembly is actually located in the closed camera of FIG. 1. Processing is accomplished, respectively, by passage of the liquid container 56 between the compressive members 32 and 34 accompanied by fracture of the container and releases and spreading of the processing liquid throughout the area of the film materials 50; by retention of the film assembly in the chamber 63 for the brief period essential to complete the diffusion transfer process; and by further drawing upon the tab 58a to remove the entire film assembly from the camera through the exit aperture 39. When the film assembly has been completely withdrawn from the camera, the leader 58, cover sheet 54 and exhausted film emulsion are stripped as a unit from a supported image-carrying layer or sheet which remains attached to the mount 44.

Figure 7:
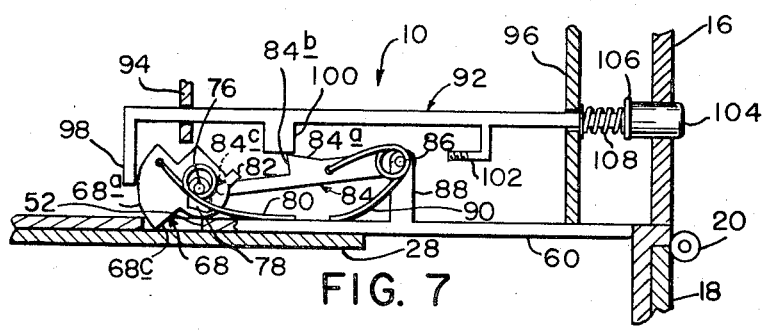

Movement of the film assembly to the left from the exposure position is illustrated in FIG. 7. The shoulder 52 of the film-unit mount 44 has carried with it the detent surface 68c, thus causing clockwise rotation of the detent against the applied bias of torsion springs 80 and 90. The lug 82 has carried the lever 84 in a counterclockwise direction. The decreasing radius of the detent surface 68a in a direction toward the point of intersection of the surfaces 68a and 68c has permitted the lever portion 84a to pass beneath the latching component 100 accompanied by a slight movement of the shaft 92 toward the right. The surface 68a of the detent thus serves a camming function. The shaft 92 and button 104 are held against further movement to the right by contact of the latching end-component 98 against the detent surface 68a.

Figure 8:
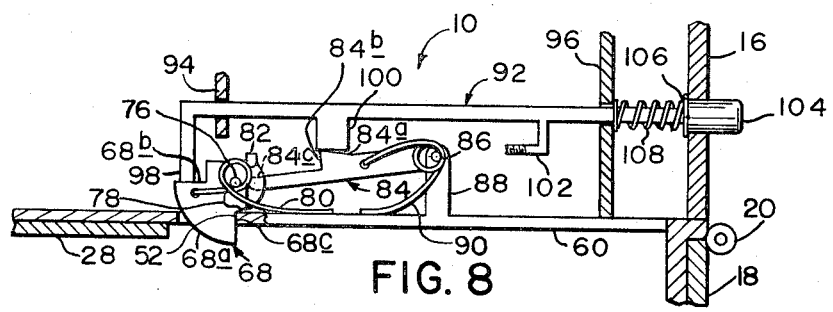

FIG. 8 illustrates passage of the trailing edge of the film assembly 28 beyond the detent 68. Control of film-assembly advancement is about to be "taken over" by the second or complementary subassembly 12. The detent 68 is free to rotate counterclockwise, under bias of the spring 80. The shaft 92 and button 104 have sprung to the right, the latter now being at the "out" position. Component 98 again bears against detent surface 68b, locking the detent against rotation. If the magazine contains additional film assemblies, as may generally be the case, the foremost one thereof would now be located at the focal plane. The camera shutter is recocked by any suitable means, e.g., separately, as previously suggested, or in a self-cocking manner by reason of its linkage with the connecting element 102 and movement of the latter to the right, as impelled by the spring 108.

Figure 11:
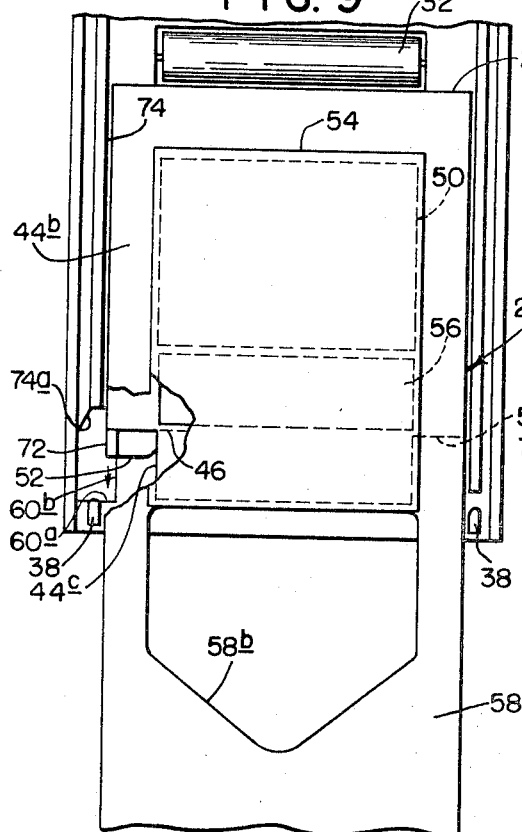
FIGS. 11 through 13 are fragmentary diagrammatic plan views, taken in a direction similar to that of FIG. 3, illustrating a sequence of operations of the mechanism of FIGS. 9 and 10.

Control of the processing operation has been assumed by the subassembly 12, as illustrated in FIG. 11. With continued advancement of the film assembly 28, and passage of its trailing edge 28a beyond the compressive means 32 and 34, the second or left-hand shoulder 52 of the film-assembly mount is brought into contact with the detent element 72. Continued pulling upon the film assembly and bearing force of shoulder 52 against detent 72 cause the latter to move straight ahead. This movement is in opposition to the applied bias of extension spring 138 (FIG. 10) and causes tensioning of the latter. Linear movement of the detent is assured by the guiding function of the edge portion 60b with which it is held in contact through tensioning of spring 138, the latter, by reason of its attachment to the arm portion 110a, applying a force for pivotal movement of the plate 110 in a counterclockwise direction about the screw 136.

Figure 12:
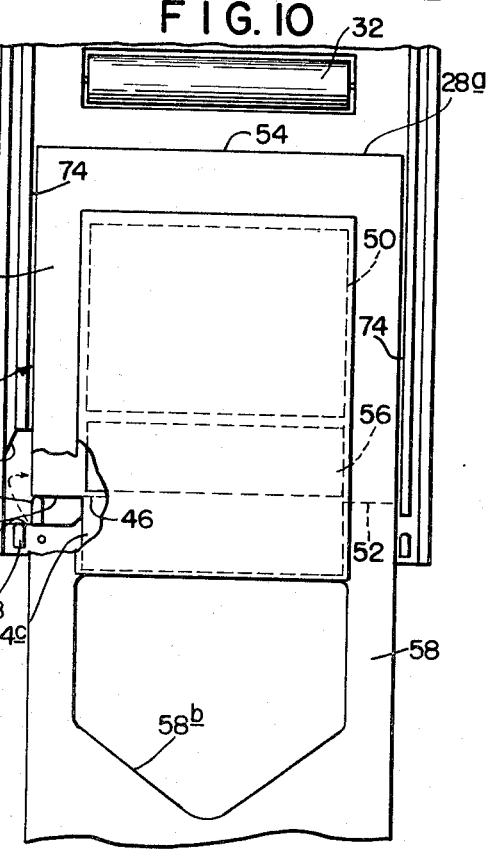

When, as shown in FIG. 12, the detent element 72 comes into contact with the laterally-extending edge portion 60a, the latter, serving as a limit stop, prevents further advancement of the film assembly. In terms of operation of the mechanism of FIG. 10, the plate-like element 110, including detent 72, arm 126 and pin 130 have, as shown, moved downwardly, that is, in the direction of film-assembly advancement, as a unit. The pin 130 has risen from the well 116 onto the ramp 118, proceeded along the ramp, across the raised portion or "plateau" 132, and has dropped again into the well 116 at a new location, in readiness for angular return movement along the guide 120, under bias of the tensioned spring 138. The film assembly is now located in the processing or so-called imbibition chamber 63 (FIG. 1) where it is allowed to remain without further movement for the brief period necessary for completion of the diffusion transfer process.

Figure 13:
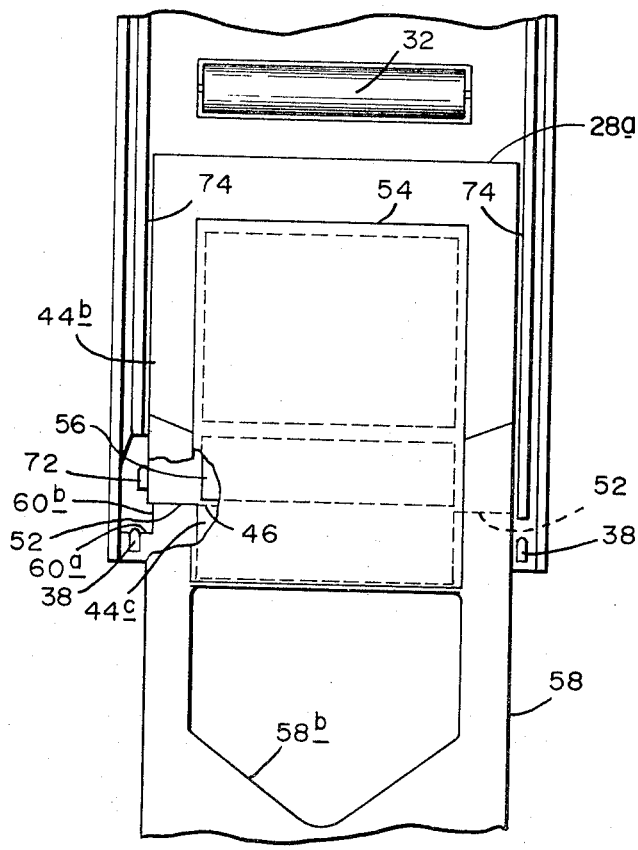

At the foregoing stage of complete cessation of movement of the film assembly 28, manual drawing force upon the tab 58a is completely relinquished. This relieves the detent element 72 of the bearing force which has been applied thereto by the shoulder 52 of the film assembly mount during its advancement. A slight retrogressive movement of the film assembly now occurs under the influence of the extended spring 138, pulling upon the plate-like element 110 and integral detent element 72. The detent element 72 does not follow a linear return path, however, but is guided in a somewhat sideways angular direction beyond the extremity of the shoulder 52 by the guide 120. At the culmination of its angular travel, the detent element 72 comes to rest against the longitudinal edge of the film-assembly mount 44, as shown in FIG. 13. It is held in slidable contact therewith by the counterclockwise pivotal force, previously described, which is applied to the arm 110a by extension spring 138.

Figure 14:
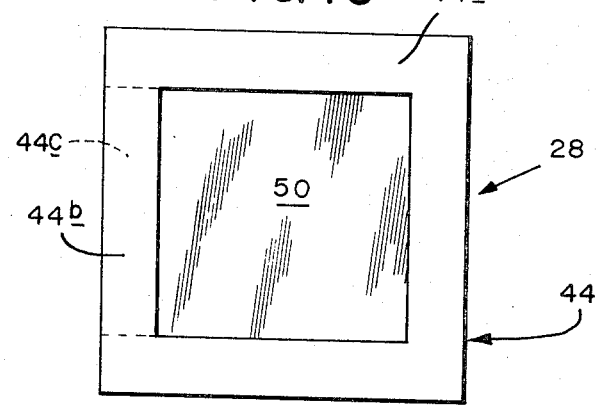
FIG. 14 is a plan view of a completed film assembly which has undergone photographic exposure and processing in the camera of FIG. 1, as controlled by apparatus of the present invention.

Upon termination of the foregoing operations and assuming that the period necessary for its processing has been completed, as for example, a period of approximately ten seconds for black-and-white and sixty seconds for color film, the film assembly may once more be manually advanced and completely withdrawn from the camera through the exit aperture at 39. When thus withdrawn and the leader 58, cover sheet 54, emulsion, etc. have been stripped away, the tab 44c of the film-assembly mount is folded over onto the front-section portion 44a from which it extends so as to effectively form a fourth side of the three-sided rear section of the mount. A pressure-sensitive adhesive holds it at this position. The film assembly now assumes the appearance shown in FIG. 14 and is ready for direct viewing or projection. The exposure and processing control apparatus of the invention has resumed the disposition of elements illustrated in FIGS. 3, 5, 10 and 11 and is in readiness for governing the exposure and processing of another film assembly urged forwardly from the magazine.

Wherein the apparatus has been described with respect to individual film units or "cut" film, it is conceivable that a "roll" film having suitable cut-out portions serving the function of the shoulders 52 might, alternatively, be employed. It is also to be understood that apparatus of the present invention could be incorporated with a camera embodying a mechanical or "programmed" type of film-assembly advancing means, as opposed to the provision of advancing means embodied in the film assembly itself in the form of a leader and draw tab.

In resumé, certain functional advantages of the apparatus of the present invention are to be noted and emphasized. These include the compactness, simplicity and positive operation of the mechanisms involved and particular adaptability to a compact or miniature camera. The apparatus precludes any possibility of a double exposure of the film assembly. It insures that a film assembly of the film pack cannot be processed unless it has previously been exposed. Moreover, the visible position of the actuating button serves at any time as an indicator of the status of each film assembly with respect to its photographic exposure and processing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for incorporation with a camera of a type adapted to expose and compressively treat a partially-mounted film assembly embodying a releasable processing liquid which assembly is advanced within and withdrawn from said camera to produce a fully-mounted photographic print suitable for direct viewing or projection, said apparatus providing a correct control of the exposure and processing of said film assembly and comprising first apparatus control means, located adjacent to the focal plane of said camera and including, respectively, rotatable detent means having a surface adapted to be selectively engaged and disengaged by given portions of each said film assembly, spring means biasing said detent means for rotation in a given direction, an elongated shaft mounted for linear movement having a plurality of integral dependent engaging portions and an actuating button at one extremity extending through an aperture formed in the housing of said camera, spring means biasing said shaft and actuating button for movement in a given direction, a first limit stop means for establishing the limit of said movement, lever means including integral contacting and locking portions mounted for rotation intermediate of and adapted to contact components of both said rotatable detent means and said shaft, spring means biasing said lever means for rotation in a direction opposite to that of said detent means, said first apparatus control means determining the positioning, holding and release of said film assembly relative to said focal plane and the exposure of said film assembly through the actuation and release of said actuating button accompanied by movement of said dependent engaging portions of said shaft with respect to said detent means, said lever means, and shutter release means of said camera, respectively, and complementary second apparatus control means located adjacent to an exit aperture of said camera for assuming control of said film assembly during its advancement for processing purposes upon relinquishment thereof by said first apparatus control means and including, respectively, translationally movable detent means having a surface adapted to be engaged and disengaged by given portions of said film assembly, supporting plate-like means integral with said detent means mounted for translational movement in a given plane and including a variably positionable pin member, an extension spring biasing said supporting plate means in at least one given direction, ramp and guide means underlying said pin member for defining translational movement of said pin member and of said plate and detent means as a unit, a second limit stop means for determining the maximum translational movement of said detent means in a given direction under propulsion by said film assembly, said detent means, when reaching said second limit stop means and by reason of the applied bias of said extension spring to said supporting plate-like means, being caused to move to a location at one side of said film assembly thereby permitting unimpeded removal of said film assembly through an exit aperture of the camera, and third limit stop means adapted to contact said supporting plate member and determine the position of said translationally movable detent means after removal of said film assembly.

2. Photographic apparatus, as defined in claim 1, wherein said camera is of a miniature type, said apparatus is of compact dimensions, and said film assembly is one of a film pack contained in a magazine loaded in said camera and biased toward said focal plane.

3. Photographic apparatus, as defined in claim 2, wherein each said film assembly includes a leader projecting through said exit aperture for effecting its manual advancement and wherein rotation of said rotatable detent means and linear movement of said translationally movable detent means are produced by contact of given portions of said film assembly mount with said detent means during advancement of said film assembly.

4. Photographic apparatus, as defined in claim 1, wherein said rotatable detent means includes a first surface adapted to bear against said film-assembly mount, a second or camming surface, a third or locking surface, and a projecting lug.

5. Photographic apparatus, as defined in claim 4, wherein said lever locking means includes means providing a transversely-disposed locking surface and wherein said elongated shaft includes dependent portions, a first of which is adapted to contact, alternately, said camming surface and said locking surface of said rotatable detent means at predetermined stages of operation, and a second of which is adapted to contact said lever locking means.

6. Photographic apparatus, as defined in claim 1, wherein said supporting plate-like means includes an angularly disposed arm portion to which one end of said extension spring is attached, the other end thereof being attached to a post projecting from a fixed portion of said camera.

7. Photographic apparatus, as defined in claim 1, wherein said supporting plate-like means includes an elongated slot, a stud of smaller diameter than the width of said slot being inserted through said slot and attached to an underlying fixed portion of said camera, whereby said plate-like means is permitted both pivotal and slidable movement relative to said stud.

8. Photographic apparatus, as defined in claim 1, wherein said pin member is mounted at one end of a resilient arm, the latter being fixedly mounted at its other end to said supporting plate-like means.

9. Photographic apparatus for incorporation with a camera of a type adapted to expose and process a semi-mounted film assembly embodying a releasable processing liquid, which assembly is advanced within said camera upon release of complementary exposure control means and withdrawn from said camera to produce a fully-mounted photographic print suitable for direct viewing or projection, said apparatus providing a correct control of the processing of said film assembly and comprising a translationally movable detent means having a surface adapted to be engaged and disengaged by given portions of said film assembly, supporting plate-like means integral with said detent means mounted for translational movement in a given plane and including a variably positionable pin member, an extension spring biasing said supporting plate means in at least one given direction, ramp and guide means underlying said pin member for defining translational movement of said pin member and of said plate and detent means as a unit, a first limit stop means for determining the maximum translational movement of said detent means in a given direction under propulsion by said film assembly, said detent means, when reaching said limit stop means and by reason of the applied bias of said extension spring to said supporting plate-like means, being caused to move along a different return path to a location at one side of said film assembly thereby permitting unimpeded removal of said film assembly through an exit aperture of the camera, and second limit stop means adapted to contact said supporting plate member and determine the position of said translationally movable detent means after removal of said film assembly.

10. A miniature camera for use with a plurality of semi-mounted film assemblies of a type including a photosensitive area, a substantially rigid slide mount surrounding said area, a processing liquid releasably contained next to said area, and a leader for manually advancing each film assembly linearly to a location outside of said camera, said camera being adapted to produce a finished transparency, fully mounted for direct viewing or projection and comprising a front housing section, a rear housing section pivotally attached to said front housing section, releasable latching means joining said housing sections, lens, shutter and diaphragm means associated with said front section, and means for controlling the exposure and processing of said film assemblies comprising first apparatus control means, located adjacent to the focal plane of said camera and including, respectively, rotatable detent means having a surface adapted to be selectively engaged and disengaged by given portions of each said film assembly, spring means biasing said detent means for rotation in a given direction, an elongated shaft mounted for linear movement having a plurality of integral dependent engaging portions and an actuating button at one extremity extending through an aperture formed in the housing of said camera, spring means, biasing said shaft and actuating button for movement in a given direction, a first limit stop means for establishing the limit of said movement, lever means including integral contacting and locking portions mounted for rotation intermediate of and adapted to contact components of both said rotatable detent means and said shaft, spring means biasing said lever means for rotation in a direction opposite to that of said detent means, said first apparatus control means determining the positioning, holding and release of said film assembly relative to said focal plane and the exposure of said film assembly through the actuation and release of said actuating button accompanied by movement of said dependent engaging portions of said shaft with respect to said detent means, said lever means, and shutter release means of said camera, respectively, and complementary second apparatus control means located adjacent to an exit aperture of said camera for assuming control of said film assembly during its advancement for processing purposes upon relinquishment thereof by said first apparatus control means and including, respectively, translationally movable detent means having a surface adapted to be engaged and disengaged by given portions of said film assembly, supporting plate-like means integral with said detent means mounted for translational movement in a given plane and including a variably positionable pin member, an extension spring biasing said supporting plate means in at least one given direction, ramp and guide means underlying said pin member for defining translational movement of said pin member and of said plate and detent means as a unit, a second limit stop means for determining the maximum translational movement of said detent means in a given direction under propulsion by said film assembly, said detent means, when reaching said second limit stop means and by reason of the applied bias of said extension spring to said supporting plate-like means, being caused to move to a location at one side of said film assembly thereby permitting unimpeded removal of said film assembly through an exit aperture of the camera, and third limit stop means adapted to contact said supporting plate member and determine the position of said translationally movable detent means after removal of said film assembly.

References Cited

UNITED STATES PATENTS

| | | | |
|---|---|---|---|
| 2,880,659 | 4/1959 | Land et al. | 95—13 |
| 2,935,004 | 5/1960 | Eburn | 95—13 |
| 3,225,671 | 12/1965 | Friedman | 95—13 |

NORTON ANSHER, *Primary Examiner.*

GARY M. HOFFMAN, *Assistant Examiner.*